United States Patent
Zhang et al.

(10) Patent No.: US 9,678,658 B2
(45) Date of Patent: Jun. 13, 2017

(54) METHOD FOR DISPLAYING INTERFACE CONTENT AND USER EQUIPMENT

(71) Applicant: Huawei Technologies Co., Ltd., Shenzhen (CN)

(72) Inventors: Ding Zhang, Shenzhen (CN); Hao Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/068,012

(22) Filed: Mar. 11, 2016

(65) Prior Publication Data

US 2016/0196033 A1 Jul. 7, 2016

Related U.S. Application Data

(63) Continuation of application No. PCT/CN2014/073097, filed on Mar. 10, 2014.

(30) Foreign Application Priority Data

Sep. 27, 2013 (CN) .......................... 2013 1 0451599

(51) Int. Cl.
*G06F 3/00* (2006.01)
*G06F 3/0488* (2013.01)
(Continued)

(52) U.S. Cl.
CPC .......... *G06F 3/0488* (2013.01); *G06F 3/0482* (2013.01); *G06F 3/04842* (2013.01); *G06F 3/04883* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 5,463,725 A | 10/1995 | Henckel et al. | |
| 2005/0192924 A1 | 9/2005 | Drucker et al. | |

(Continued)

FOREIGN PATENT DOCUMENTS

| | | |
|---|---|---|
| CN | 101231564 A | 7/2008 |
| CN | 101310248 A | 11/2008 |

(Continued)

OTHER PUBLICATIONS

Foreign Communication From A Counterpart Application, European Application No. 14848031.2, Extended European Search Report dated Aug. 3, 2016, 9 pages.

(Continued)

*Primary Examiner* — Hua Lu
(74) *Attorney, Agent, or Firm* — Conley Rose, P.C.

(57) ABSTRACT

A method for displaying interface content and user equipment, which effectively improve interaction experience of a user when the user performs a flick operation on a touchscreen, and enhance pleasure in application interaction. A specific solution is acquiring an initial position and a movement direction of a touch point, determining a motion parameter of an interface element object in each grid on a screen according to the initial position and the movement direction, where the screen is divided in advance into multiple grids, and each grid includes a preset quantity of pixels, and moving the interface element object in each grid according to the motion parameter of the interface element object in each grid.

20 Claims, 5 Drawing Sheets

(51) Int. Cl.
  *G06F 3/0482*  (2013.01)
  *G06F 3/0484*  (2013.01)

(56) References Cited

U.S. PATENT DOCUMENTS

| | | | |
|---|---|---|---|
| 2007/0109279 A1* | 5/2007 | Sigona | G06F 3/0418 345/177 |
| 2008/0052636 A1 | 2/2008 | Abe et al. | |
| 2008/0180402 A1 | 7/2008 | Yoo et al. | |
| 2009/0207184 A1 | 8/2009 | Laine et al. | |
| 2010/0023858 A1 | 1/2010 | Ryu et al. | |
| 2010/0088646 A1* | 4/2010 | Nishimori | H04N 19/61 715/838 |
| 2010/0302274 A1* | 12/2010 | Lee | H04N 5/44591 345/619 |
| 2011/0199318 A1 | 8/2011 | Fong et al. | |
| 2011/0202834 A1* | 8/2011 | Mandryk | G06F 3/04883 715/701 |
| 2011/0271182 A1 | 11/2011 | Tsai et al. | |
| 2012/0098868 A1* | 4/2012 | Nagasaka | G06F 3/04883 345/684 |
| 2012/0162267 A1* | 6/2012 | Shimazu | G06F 3/04883 345/684 |
| 2012/0229410 A1* | 9/2012 | Ohashi | G06F 3/04883 345/173 |
| 2013/0016106 A1* | 1/2013 | Yip | G06T 11/206 345/440 |
| 2013/0036386 A1* | 2/2013 | Park | G06F 3/0485 715/831 |
| 2013/0093795 A1* | 4/2013 | Miyazaki | G06F 3/0485 345/684 |
| 2013/0179829 A1* | 7/2013 | Kwon | G06F 3/0488 715/784 |
| 2013/0198678 A1 | 8/2013 | Lee et al. | |
| 2013/0238724 A1 | 9/2013 | Cunningham | |
| 2013/0254717 A1 | 9/2013 | Al-Ali et al. | |

FOREIGN PATENT DOCUMENTS

| | | |
|---|---|---|
| CN | 101902595 A | 12/2010 |
| CN | 102609210 A | 7/2012 |
| CN | 102714765 A | 10/2012 |
| CN | 102915187 A | 2/2013 |
| CN | 103034450 A | 4/2013 |
| CN | 103530052 A | 1/2014 |
| EP | 2444885 A1 | 4/2012 |
| JP | 20050276178 A | 10/2005 |
| JP | 2008052621 A | 3/2008 |
| JP | 2010092246 A | 4/2010 |
| JP | 20110028451 A | 2/2011 |
| JP | 2012093802 A | 5/2012 |
| JP | 20120137822 A | 7/2012 |
| JP | 20130058009 A | 3/2013 |
| JP | 2013088974 A | 5/2013 |
| JP | 2013519952 A | 5/2013 |
| KR | 20130081502 A | 7/2013 |
| RU | 2109337 C1 | 4/1998 |
| RU | 2480938 C2 | 4/2013 |
| WO | 9742590 A1 | 11/1997 |
| WO | 2011080617 A2 | 7/2011 |

OTHER PUBLICATIONS

Partial English Translation and Abstract of Japanese Patent Application No. JPA2005276178, Sep. 12, 2016, 25 pages.
Partial English Translation and Abstract of Japanese Patent Application No. JPA2008052621, Sep. 12, 2016, 17 pages.
Partial English Translation and Abstract of Japanese Patent Application No. JPA2010092246, Sep. 12, 2016, 18 pages.
Partial English Translation and Abstract of Japanese Patent Application No. JPA2011028451, Sep. 12, 2016, 32 pages.
Partial English Translation and Abstract of Japanese Patent Application No. JPA2012093802, Sep. 12, 2016, 22 pages.
Partial English Translation and Abstract of Japanese Patent Application No. JPA2012137822, Sep. 12, 2016, 29 pages.
Partial English Translation and Abstract of Japanese Patent Application No. JPA2013058009, Sep. 12, 2016, 28 pages.
Partial English Translation and Abstract of Japanese Patent Application No. JPA2013088974, Sep. 12, 2016, 51 pages.
Partial English Translation and Abstract of Japanese Patent Application No. JPA2013519952, Sep. 12, 2016, 51 pages.
Foreign Communication From A Counterpart Application, Japanese Application No. 2016-517457, Japanese Office Action dated Aug. 16, 2016, 4 pages.
Foreign Communication From A Counterpart Application, Japanese Application No. 2016-517457, English Translation of Japanese Office Action dated Aug. 16, 2016, 5 pages.
Foreign Communication From a Counterpart Application, Russian Application No. 2016116006, Russian Letter Official Decision of Grant dated Sep. 14, 2016, 2 pages.
Foreign Communication From A Counterpart Application, Russian Application No. 2016116006/08, Russian Notice of Allowance dated Aug. 15, 2016, 9 pages.
Partial English Translation and Abstract of Chinese Patent Application No. CN103530052, Mar. 15, 2016, 2 pages.
Foreign Communication From A Counterpart Application, Korean Application No. 10-2016-7007632, Korean Office Action dated May 3, 2016, 5 pages.
Foreign Communication From A Counterpart Application, Korean Application No. 10-2016-7007632, English Translation of Korean Office Action dated May 3, 2016, 4 pages.
Foreign Communication From A Counterpart Application, PCT Application No. PCT/CN2014/073097, English Translation of International Search Report dated Jul. 8, 2014, 2 pages.
Foreign Communication From A Counterpart Application, PCT Application No. PCT/CN2014/073097, English Translation of Written Opinion dated Jul. 3, 2014, 6 pages.
Foreign Communication From A Counterpart Application, Chinese Application No. 201310451599.6, Chinese Office Action dated Nov. 26, 2015, 7 pages.
Partial English Translation and Abstract of Chinese Patent Application No. CN102609210, Aug. 5, 2016, 7 pages.
Partial English Translation and Abstract of Chinese Patent Application No. CN103034450, Aug. 5, 2016, 5 pages.
Foreign Communication From A Counterpart Application, Chinese Application No. 201310451599.6, Chinese Office Action dated Jul. 29, 2016, 4 pages.
Foreign Communication From A Counterpart Application, Chinese Application No. 201310451599.6, Chinese Search Report dated Jul. 20, 2016, 2 pages.

* cited by examiner

FIG. 6

METHOD FOR DISPLAYING INTERFACE CONTENT AND USER EQUIPMENT

CROSS-REFERENCE TO RELATED APPLICATIONS

This application is a continuation of International Application No. PCT/CN2014/073097, filed on Mar. 10, 2014, which claims priority to Chinese Patent Application No. 201310451599.6, filed on Sep. 27, 2013, both of which are hereby incorporated by reference in their entireties.

TECHNICAL FIELD

The present disclosure relates to the field of communications, and in particular, to a method for displaying interface content and user equipment.

BACKGROUND

In existing large-screen intelligent terminals, performing a flick on a screen with a finger to scroll an interface up and down or scroll an interface left and right has become a technology that is extremely widely applied. Especially, in a great many of list-type interfaces, thumbnail interfaces of album-type or gallery-type applications, and the like, there is usually extremely long interface extension space, and a flick operation performed by a user to scroll a screen has become extremely common. In the prior art, after a flick operation is performed on a screen with a finger, a device responds, and content on the screen is correspondingly refreshed according to a flick direction of the finger, thereby presenting an effect that the content is scrolled as a whole.

However, in the prior art, when a flick is performed on a screen with a finger, content on the screen is correspondingly refreshed according to a flick direction of the finger, presenting an effect that the whole content is scrolled, which is relatively mechanized, and lacks real and exquisite interaction experience.

SUMMARY

Embodiments of the present disclosure provide a method for displaying interface content and user equipment, which effectively improve interaction experience of a user when the user performs a flick operation on a touchscreen, and enhance pleasure in application interaction.

To achieve the foregoing objective, the following technical solutions are adopted in the embodiments of the present disclosure.

A first aspect provides a method for displaying interface content, where the method includes acquiring an initial position and a movement direction of a touch point, determining a motion parameter of an interface element object in each grid on a screen according to the initial position and the movement direction, where the screen is divided in advance into multiple grids, and each grid includes a preset quantity of pixels, and moving the interface element object in each grid according to the motion parameter of the interface element object in each grid.

With reference to the first aspect, in a first possible implementation manner, a coordinate system is set on the screen, the acquiring an initial position of a touch point includes acquiring an initial horizontal coordinate and an initial vertical coordinate of the touch point in the coordinate system, and the movement direction of the touch point includes a direction of a horizontal axis or a direction of a vertical axis.

With reference to the first possible implementation manner of the first aspect, in a second possible implementation manner, the determining a motion parameter of an interface element object in each grid on a screen according to the initial position and the movement direction includes, in the direction of the horizontal axis of the coordinate system, an interface element object in a grid in which a point that is N first unit distances away from the initial horizontal coordinate is located needs to move along the movement direction after a delay of M first unit times, and in the direction of the vertical axis of the coordinate system, an interface element object in a grid in which a point that is A second unit distances away from the initial vertical coordinate is located needs to move along the movement direction after a delay of B second unit times, and a grid within a preset range moves simultaneously with the touch point, where the touch point is within the preset range.

With reference to the second possible implementation manner of the first aspect, in a third possible implementation manner, the grid within the preset range includes a grid that is in a column including a grid in which the touch point is located, and that is on a side, along the movement direction, of the grid in which the touch point is located, and/or a grid that is covered by a circle with the initial position of the touch point as a center and c pixels as a radius, where being covered includes being partially covered and being completely covered, and c is a non-negative number.

With reference to the second possible implementation manner of the first aspect, in a fourth possible implementation manner, the grid in which a point that is N first unit distances away from the initial horizontal coordinate is located is a grid in which a point that is N×a pixels away from the initial horizontal coordinate is located, and the grid in which a point that is A second unit distances away from the initial vertical coordinate is located is a grid in which a point that is A×b pixels away from the initial vertical coordinate is located.

According to a second aspect, user equipment is provided, where the user equipment includes an acquiring unit configured to acquire an initial position and a movement direction of a touch point, a parameter determining unit configured to determine a motion parameter of an interface element object in each grid on a screen according to the initial position and the movement direction, where the screen is divided in advance into multiple grids, and each grid includes a preset quantity of pixels, and a movement unit configured to move the interface element object in each grid according to the motion parameter of the interface element object in each grid.

With reference to the second aspect, in a first possible implementation manner, a coordinate system is set on the screen of the equipment, the acquiring unit is further configured to acquire the initial position of the touch point, including acquire an initial horizontal coordinate and an initial vertical coordinate of the touch point in the coordinate system, and the movement direction of the touch point includes a direction of a horizontal axis or a direction of a vertical axis.

With reference to the first possible implementation manner of the second aspect, in a second possible implementation manner, the parameter determining unit is further configured to, in the direction of the horizontal axis of the coordinate system, an interface element object in a grid in which a point that is N first unit distances away from the initial horizontal coordinate is located needs to move along the movement direction after a delay of M first unit times, and in the direction of the vertical axis of the coordinate system, an interface element object in a grid in which a point that is A second unit distances away from the initial vertical coordinate is located needs to move along the movement direction after a delay of B second unit times, where a grid within a preset range moves simultaneously with the touch point, where the touch point is within the preset range.

With reference to the second possible implementation manner of the second aspect, in a third possible implementation manner, the grid within the preset range includes a grid that is in a column including a grid in which the touch point is located, and that is on a side, along the movement direction, of the grid in which the touch point is located; and/or a grid that is covered by a circle with the initial position of the touch point as a center and c pixels as a radius, where being covered includes being partially covered and being completely covered, and c is a non-negative number.

With reference to the second possible implementation manner of the second aspect, in a fourth possible implementation manner, the grid in which a point that is N first unit distances away from the initial horizontal coordinate is located is a grid in which a point that is N×a pixels away from the initial horizontal coordinate is located, and the grid in which a point that is A second unit distances away from the initial vertical coordinate is located is a grid in which a point that is A×b pixels away from the initial vertical coordinate is located.

The embodiments of the present disclosure provide a method for displaying interface content and user equipment. First, an initial position and a movement direction of a touch point are acquired. Next, a motion parameter of an interface element object in each grid on a screen is determined according to the initial position and the movement direction, where the screen is divided in advance into multiple grids, and each grid includes a preset quantity of pixels. Then, the interface element object in each grid is moved according to the motion parameter of the interface element object in each grid, and finally, display of interface content is implemented. In this way, interaction experience of a user when the user performs a flick operation on a touchscreen can be effectively improved, and pleasure in application interaction can be enhanced.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show only some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are only some but not all of the embodiments of the present disclosure. All other embodiments obtained by a person of ordinary skill in the art based on the embodiments of the present disclosure without creative efforts shall fall within the protection scope of the present disclosure.

Figure 1:
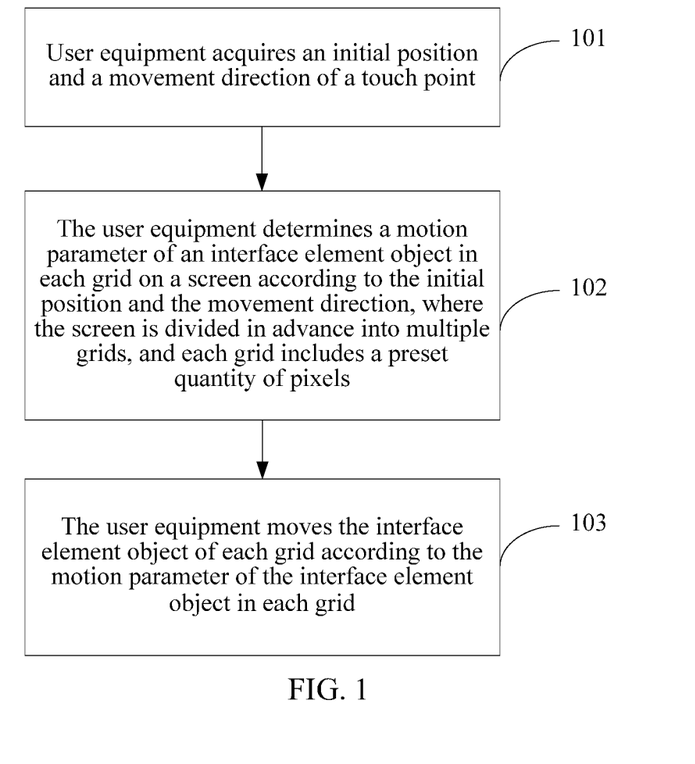
FIG. 1 is a first schematic flowchart of a method for displaying interface content according to an embodiment of the present disclosure.

An embodiment of the present disclosure provides a method for displaying interface content. As shown in FIG. 1, the method includes the following steps.

Step 101: User equipment acquires an initial position and a movement direction of a touch point.

Step 102: The user equipment determines a motion parameter of an interface element object in each grid on a screen according to the initial position and the movement direction, where the screen is divided in advance into multiple grids, and each grid includes a preset quantity of pixels.

Step 103: The user equipment moves the interface element object in each grid according to the motion parameter of the interface element object in each grid.

This embodiment of the present disclosure provides a method for displaying interface content. First, an initial position and a movement direction of a touch point are acquired. Next, a motion parameter of an interface element object in each grid on a screen is determined according to the initial position and the movement direction, where the screen is divided in advance into multiple grids, and each grid includes a preset quantity of pixels. Then, the interface element object in each grid is moved according to the motion parameter of the interface element object in each grid, and finally, display of interface content is implemented. In this way, interaction experience of a user when the user performs a flick operation on a touchscreen can be effectively improved, and pleasure in application interaction can be enhanced.

Figure 2:
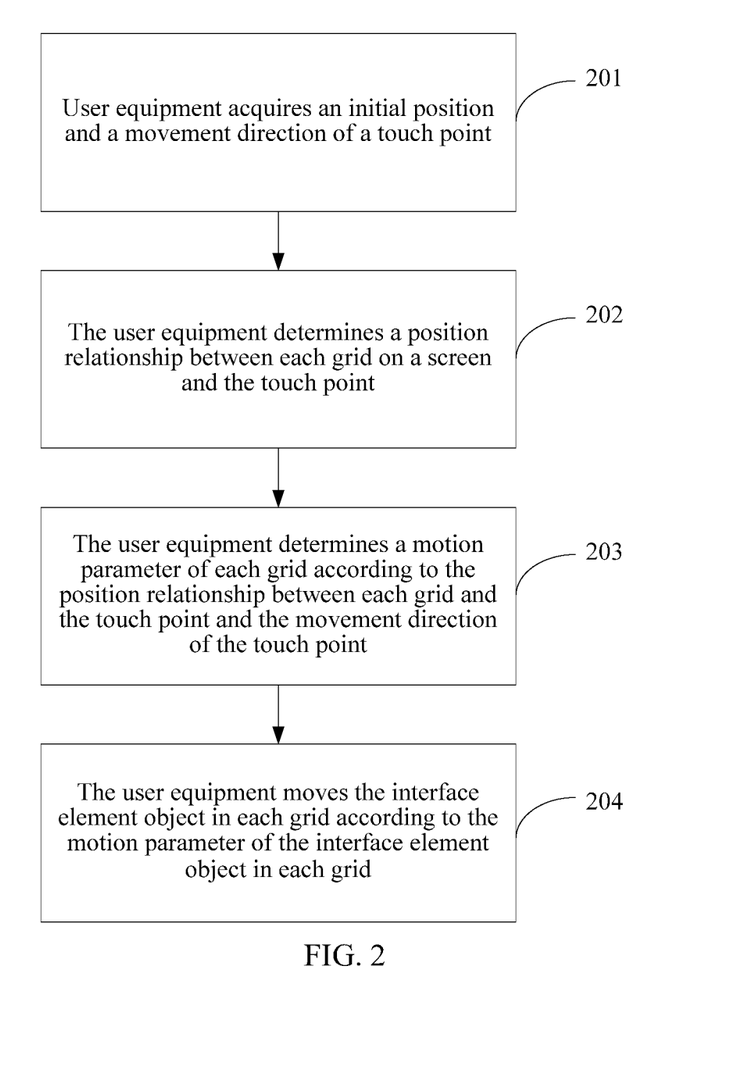
FIG. 2 is a second schematic flowchart of a method for displaying interface content according to an embodiment of the present disclosure.

To help a person skilled in the art understand the technical solutions provided by the embodiments of the present disclosure more clearly, the following describes in detail, with reference to a specific embodiment, another method for displaying interface content according to an embodiment of the present disclosure. As shown in FIG. 2, the method includes the following steps.

Step 201: User equipment acquires an initial position and a movement direction of a touch point.

Furthermore, a coordinate system is set on a screen, and an initial horizontal coordinate and an initial vertical coordinate of the touch point in the coordinate system are acquired.

The movement direction of the touch point includes a direction of a horizontal axis or a direction of a vertical axis.

Exemplarily, a method for determining the movement direction of the touch point may be acquiring initial coordinates of the touch point in the coordinate system and ending coordinates, of the touch point, obtained after movement is ended, and determining the movement direction according to the initial coordinates and the ending coordinates.

In addition, if a user performs a slant flick operation rather than a horizontal or vertical flick operation on the screen, that is, the touch point does not move along the direction of the horizontal axis or the direction of the vertical axis, it is considered, according to the movement direction, that the touch point moves along the direction of the horizontal axis or the direction of the vertical axis. Furthermore, a straight line may first be determined according to the initial coordinates and the ending coordinates, where the straight line is a straight line along the movement direction. An included angle between the straight line and the horizontal axis or vertical axis is then acquired. If the included angle between the straight line and the horizontal axis is less than the included angle between the straight line and the vertical axis, it may be considered that the touch point moves along the direction of the horizontal axis, that is, the user performs a horizontal flick operation. Otherwise, it may be considered that the touch point moves along the direction of the vertical axis.

Step 202: The user equipment determines a position relationship between each grid on a screen and the touch point.

Exemplarily, the screen may be divided in advance into several grids, and each grid includes a preset quantity of pixels. A division granularity of a grid determines a quantity of pixels in each grid. Specific division may be determined according to an actual situation.

Step 203: The user equipment determines a motion parameter of each grid according to the position relationship between each grid and the touch point and the movement direction of the touch point.

Exemplarily, a grid within a preset range moves simultaneously with the touch point, and the touch point is also included in the preset range.

The grid within the preset range may include a grid that is in a column including a grid in which the touch point is located, and that is on a side, along the movement direction, of the grid in which the touch point is located, and the grid within the preset range may further include a grid that is covered by a circle with the initial position of the touch point as a center and c pixels as a radius, where being covered includes being partially covered and being completely covered, and c is a non-negative number.

In addition, a motion parameter of another grid than the grid within the preset range may be a time delay, which is further determined in the following manner. In the direction of the horizontal axis of the coordinate system, an interface element object in a grid in which a point that is N first unit distances away from the initial horizontal coordinate of the touch point is located needs to move along the movement direction after a delay of M first unit times, that is, the motion parameter is M×first unit time, and in the direction of the vertical axis of the coordinate system, an interface element object in a grid in which a point that is A second unit distances away from the initial vertical coordinate of the touch point is located needs to move along the movement direction after a delay of B second unit times, that is, the motion parameter is B×second unit time, where M and N are same or different, A and B are same or different, and M, N, A, and B are positive numbers.

A side length of the grid is less than the first unit distance and the second unit distance, and in this way, it can be ensured that in the grid, there is only one point that is N first unit distances away from the initial horizontal coordinate of the touch point and that is A second unit distances away from the initial vertical coordinate of the touch point.

Particularly, different grid division strategies may be used according to different requirements. Under a circumstance in which there is no gap between grids obtained by means of division, a special case in which the touch point is on an edge of a grid is described as follows.

When the touch point is on a side of a grid, if the touch point moves along the direction of the vertical axis and slides upward (that is, in a positive direction of the vertical axis), and the touch point is located on a side, in the direction of the vertical axis, of the grid, the side on which the touch point is located is a common side of two adjacent grids (where the grids are located in two adjacent columns, and therefore, the two grids are adjacent in the direction of the horizontal axis) because there is no gap between the grids. Therefore, it may be considered that grids in which the touch point is located are the two grids, and it may be determined that all of the two grids and grids that are in the two columns in which the two grids are located and that are above the two grids are grids within the preset range, and these grids all move with the touch point.

Alternatively, if the touch point still moves along the direction of the vertical axis, but the touch point is located on a side, in the direction of the horizontal axis, of the grid, according to a same principle, it may be considered that grids in which the touch point is located are also two adjacent grids (where the two grids are located in a same column, and therefore, the two grids are adjacent in the direction of the vertical axis). Therefore, it may be determined that all of the two grids and grids that are in the column in which the two grids are located and that are above the two grids are grids within the preset range, and these grids all move with the touch point.

If the touch point moves along the direction of the horizontal axis, and slides rightwards (that is, in a positive direction of the horizontal axis), and the touch point is located on a side, in the direction of the horizontal axis, of the grid, according to the same principle, grids in which the touch point is located are also two adjacent grids (where the grids are located in two adjacent rows, and therefore, the two grids are adjacent in the direction of the vertical axis). Therefore, it may be determined that all of the two grids and grids that are on the right of the two grids and that are in the two rows in which the two grids are located are grids within the preset range, and these grids all move with the touch point.

Alternatively, if the touch point still moves along the direction of the horizontal axis, but the touch point is located on a side, in the direction of the vertical axis, of the grid, according to the same principle, grids in which the touch point is located are also two adjacent grids (where the grids are located in a same row, and therefore, the two grids are adjacent in the direction of the horizontal axis). Therefore, it may be determined that all of the two grids and grids that are on the right of the two grids and that are in the row in which the two grids are located are grids within the preset range, and these grids all move with the touch point.

In addition, the interface element object in the grid is content displayed within the grid on the screen, where the content may be an image or text.

Optionally, the first unit distance may be a pixels, and the second unit distance may be b pixels, where a and b are both preset quantities of pixels, and a and b may be same or different. The first unit time may be x milliseconds, and the second unit time may be y milliseconds, where x and y are both positive numbers, and x and y are same or different.

Exemplarily, it is assumed that M=N=2, A=B=1, and in the direction of the horizontal axis, a distance between a point in a grid C and the touch point is 2a pixels, and in the direction of the vertical axis, a distance between the point in the grid C and the touch point is b pixels. After the touch point moves, a delay of 2x milliseconds is required before an interface element object in the grid C moves in the direction of the horizontal axis, and a delay of y milliseconds is required before the interface element object in the grid C moves in the direction of the vertical axis. That is, after the touch point moves, a delay of (2x+y) milliseconds is required before the interface element object in the grid C can move according to the movement direction of the touch point.

Step 204: The user equipment moves an interface element object in each grid according to a motion parameter of the interface element object in each grid.

Figure 3:
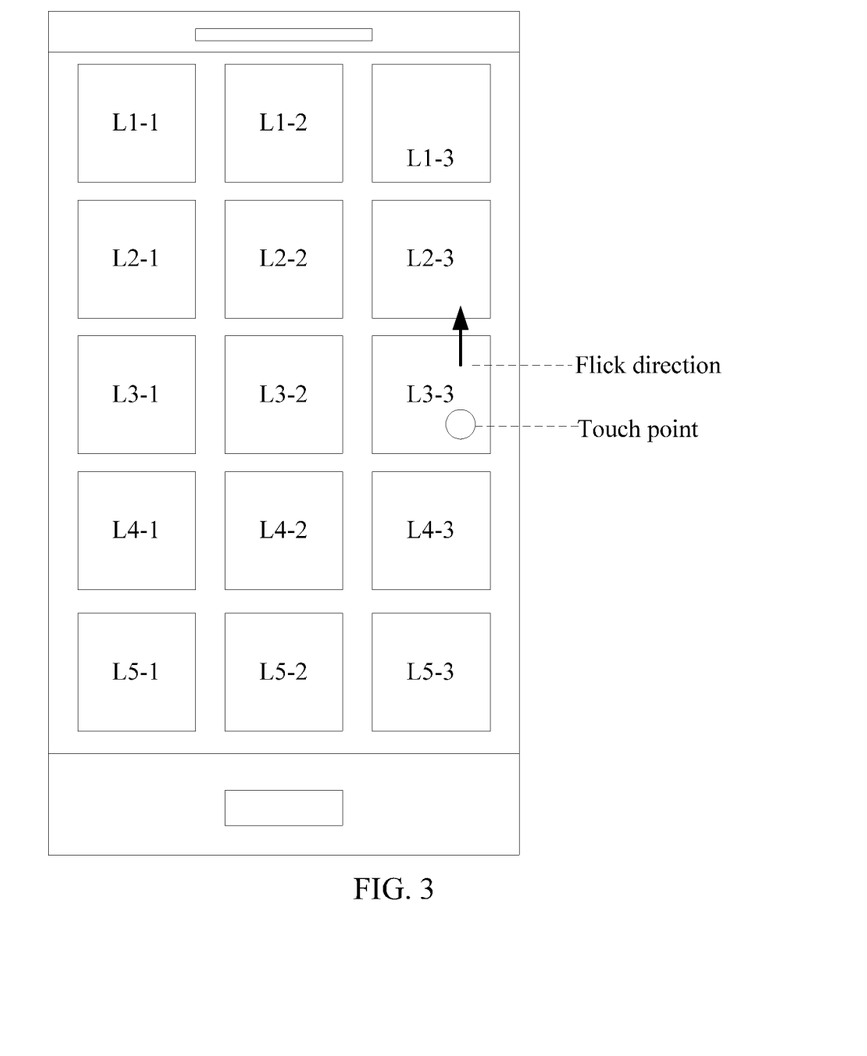
FIG. 3 is a first schematic diagram of an effect a method for displaying interface content according to an embodiment of the present disclosure.

To enable a person skilled in the art understand the present disclosure more clearly, detailed description is made in the following using a schematic example. As shown in FIG. 3, it is assumed that a screen of user equipment is divided into grids shown in the figure, and an initial position of a touch point is within a grid L3-3.

When a finger presses the touch point and starts to flick towards the top of the screen, a delay effect starts to appear. A delay in motion of each grid on the screen in two dimensions, that is, a vertical column dimension and a horizontal row dimension, is defined as follows.

First, a delay rule for vertical columns is defined. It is assumed that a finger touch point is located within a grid L3-3. L1-3 and L2-3 are right above L3-3, and L1-3, L2-3, and L3-3 move simultaneously with the touch point along a same direction without any delay. A column closest to the finger touch point is the third column that includes the grid in which the touch point is located, an adjacent column is the second column, and it is defined that the second column starts moving after a delay of X milliseconds. A column farther away from the touch point is the first column, and it is defined that the first column starts moving X milliseconds later than the second column, that is, the first column moves after a delay of 2X milliseconds relative to the third column in which the touch point is located. Secondly, a delay rule for horizontal rows is defined. The finger touch point is located in the third row in which the grid L3-3 is located. It is defined that the fourth row starts moving after a delay of Y milliseconds relative to the third row, and the fifth row starts moving after a delay of Y milliseconds relative to the fourth row. That is, the fifth row moves after a delay of 2Y milliseconds relative to the third row.

Figure 4:
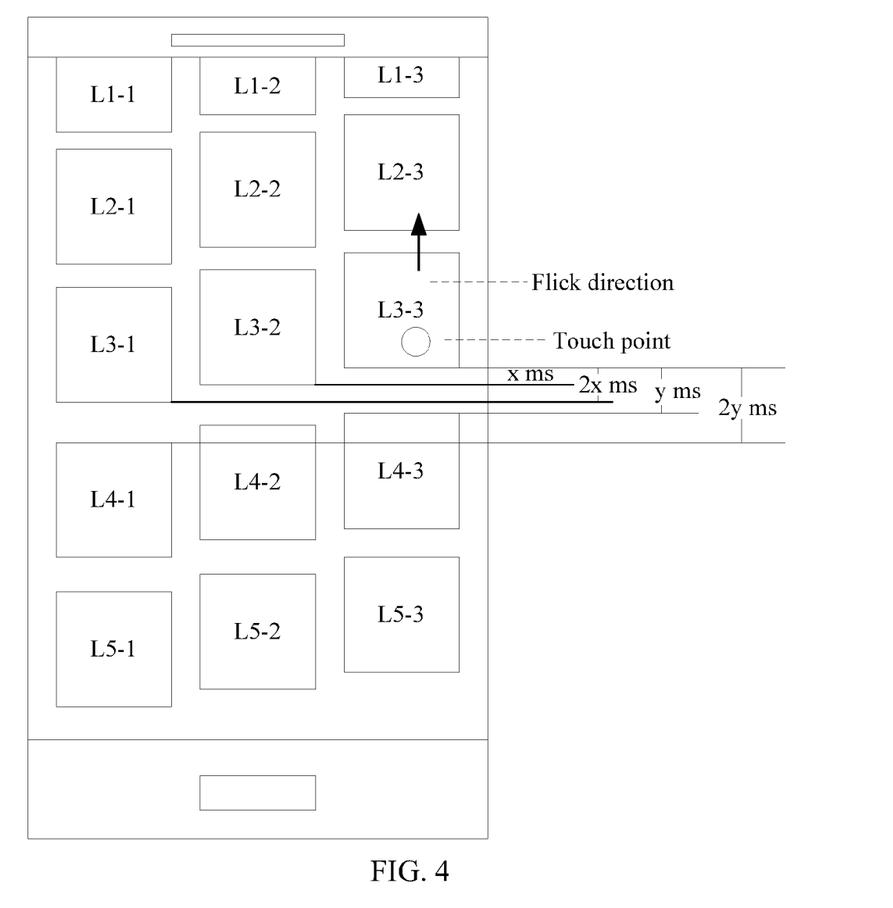
FIG. 4 is a second schematic diagram of an effect of a method for displaying interface content according to an embodiment of the present disclosure.

Delays in movement of grids on the screen are shown in FIG. 4. Grids L3-2, L4-1, and L5-1 are used as examples to describe the delay rules. L3-2 starts moving Y milliseconds later than L3-3. L4-1 starts moving (Y+2X) milliseconds later than L3-3, and L5-1 starts moving (2Y+2X) milliseconds later than L3-3. In addition, grid division shown in FIG. 3 and FIG. 4 is only for a schematic purpose, and there is no gap between grids. A specific division manner may be set according to an actual situation, which is not limited herein.

This embodiment of the present disclosure provides a method for displaying interface content. First, an initial position and a movement direction of a touch point are acquired. Next, a motion parameter of an interface element object in each grid on a screen is determined according to the initial position and the movement direction, where the screen is divided in advance into multiple grids, and each grid includes a preset quantity of pixels. Then, the interface element object in each grid is moved according to the motion parameter of the interface element object in each grid, and finally, display of interface content is implemented. In this way, interaction experience of a user when the user performs a flick operation on a touchscreen can be effectively improved, and pleasure in application interaction can be enhanced.

Figure 5:
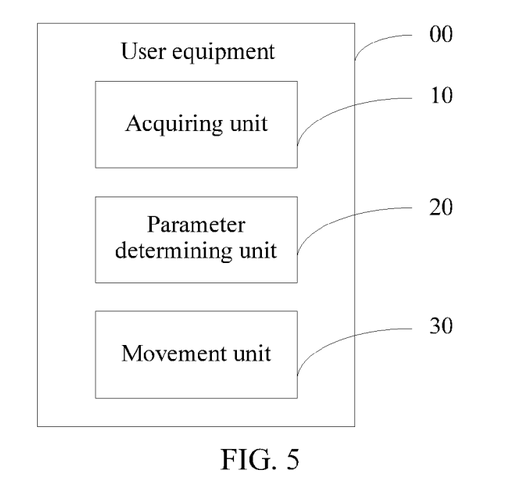
FIG. 5 is a first schematic structural diagram of user equipment according to an embodiment of the present disclosure.

An embodiment of the present disclosure provides user equipment 00. As shown in FIG. 5, the user equipment includes an acquiring unit 10 configured to acquire an initial position and a movement direction of a touch point, a parameter determining unit 20 configured to determine a motion parameter of an interface element object in each grid on a screen according to the initial position and the movement direction, where the screen is divided in advance into multiple grids, and each grid includes a preset quantity of pixels, and a movement unit 30 configured to move the interface element object in each grid according to the motion parameter of the interface element object in each grid.

Optionally, a coordinate system is set on the screen of the user equipment. The acquiring unit 10 may be further configured to acquire the initial position of the touch point, including acquire an initial horizontal coordinate and an initial vertical coordinate of the touch point in the coordinate system, and the movement direction of the touch point includes a direction of a horizontal axis or a direction of a vertical axis.

Optionally, the parameter determining unit 20 may be further configured to, in the direction of the horizontal axis of the coordinate system, an interface element object in a grid in which a point that is N first unit distances away from the initial horizontal coordinate is located needs to move along the movement direction after a delay of M first unit times, and in the direction of the vertical axis of the coordinate system, an interface element object in a grid in which a point that is A second unit distances away from the initial vertical coordinate is located needs to move along the movement direction after a delay of B second unit times, where M and N are same or different, A and B are same or different, and M, N, A, and B are positive numbers.

Optionally, the first unit distance may be a pixels, and the second unit distance may be b pixels.

A grid within a preset range moves simultaneously with the touch point, where the touch point is within the preset range.

Optionally, the grid within the preset range may be a grid that is in a column including a grid in which the touch point is located, and that is on a side, along the movement direction, of the grid in which the touch point is located; and a grid that is covered by a circle with the initial position of the touch point as a center and c pixels as a radius, where being covered includes being partially covered and being completely covered, and c is a non-negative number.

This embodiment of the present disclosure provides user equipment, which first acquires an initial position and a movement direction of a touch point. Next, determines a motion parameter of an interface element object in each grid on a screen according to the initial position and the movement direction, where the screen is divided in advance into multiple grids, and each grid includes a preset quantity of pixels; then, moves the interface element object in each grid according to the motion parameter of the interface element object in each grid, and finally, implements display of interface content. In this way, interaction experience of a user when the user performs a flick operation on a touchscreen can be effectively improved, and pleasure in application interaction can be enhanced.

Figure 6:
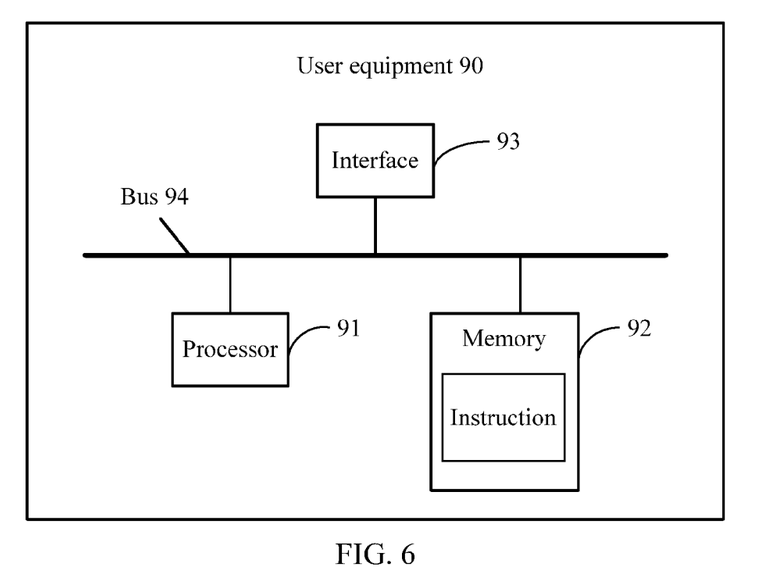
FIG. 6 is a second schematic structural diagram of user equipment according to an embodiment of the present disclosure.

An embodiment of the present disclosure further provides user equipment 90. As shown in FIG. 6, the equipment 90 includes a bus 94, a processor 91, a memory 92, and an interface 93 that are connected to the bus 94. The interface 93 is configured to communicate with a network element, where the network element may be another piece of user equipment, or a network management device, for example, a base station. The memory 92 is configured to store an instruction. The processor 91 is configured to execute the instruction to acquire an initial position and a movement direction of a touch point, determine a motion parameter of an interface element object in each grid on a screen according to the initial position and the movement direction, where the screen is divided in advance into multiple grids, and each grid includes a preset quantity of pixels, and move the interface element object in each grid according to the motion parameter of the interface element object in each grid.

Optionally, the processor 91 executes the instruction and may be further configured to set a coordinate system on a screen, and acquire an initial horizontal coordinate and an initial vertical coordinate of the touch point in the coordinate system, and the movement direction of the touch point includes a direction of a horizontal axis or a direction of a vertical axis.

Optionally, the processor 91 executes the instruction and may be further configured to, in the direction of the horizontal axis of the coordinate system, an interface element object in a grid in which a point that is N first unit distances away from the initial horizontal coordinate is located needs to move along the movement direction after a delay of M first unit times, and in the direction of the vertical axis of the coordinate system, an interface element object in a grid in which a point that is A second unit distances away from the initial vertical coordinate is located needs to move along the movement direction after a delay of B second unit times, and a grid within a preset range moves simultaneously with the touch point, where the touch point is located within the preset range, where M and N are same or different, A and B are same or different, and M, N, A, and B are positive numbers.

Optionally, the grid within the preset range may include a grid that is in a column including a grid in which the touch point is located, and that is on a side, along the movement direction, of the grid in which the touch point is located, and a grid that is covered by a circle with the initial position of the touch point as a center and c pixels as a radius, where being covered includes being partially covered and being completely covered, and c is a non-negative number.

Optionally, the interface element object in the grid in which a point that is N first unit distances away from the initial horizontal coordinate is located may be a grid in which a point that is N×a pixels away from the initial horizontal coordinate is located, and the grid in which a point that is A second unit distances away from the initial vertical coordinate is located may be a grid in which a point that is A×b pixels away from the initial vertical coordinate is located, where a and b are both values of preset quantities of pixels, and a and b are same or different.

This embodiment of the present disclosure provides user equipment, which first acquires an initial position and a movement direction of a touch point. Next, determines a motion parameter of an interface element object in each grid on a screen according to the initial position and the movement direction, where the screen is divided in advance into multiple grids, and each grid includes a preset quantity of pixels. Then, moves the interface element object in each grid according to the motion parameter of the interface element object in each grid, and finally, implements display of interface content. In this way, interaction experience of a user when the user performs a flick operation on a touchscreen can be effectively improved, and pleasure in application interaction can be enhanced.

The term "and/or" in the present disclosure describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the several embodiments provided in the present application, it should be understood that the disclosed method and device may be implemented in other manners. For example, the described apparatus embodiment is only exemplary. For example, the unit division is only logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are only specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for displaying interface content, comprising:
acquiring an initial position and a movement direction of a touch point;
determining a motion parameter of an interface element object in each grid section on a screen according to the initial position and the movement direction, wherein the screen is divided in advance into a grid comprising multiple grid sections arranged in rows and columns, and wherein each grid section comprises a preset quantity of pixels;
setting a row delay of each grid section based on a position of a row of a grid section relative to a row of the touch point;
setting a column section based on a position of a column of a grid section relative to a column of the touch point; and
moving the interface element object in each grid section according to the motion parameter of the interface element object in each grid section and a delay corresponding to each grid section, wherein the delay corresponding to each grid section is a sum of the row delay and the column delay, and wherein the row delay and the column delay each increase as a distance between the grid section and the touch point increases.

2. The method according to claim 1, wherein a coordinate system is set on the screen, wherein acquiring the initial position of the touch point comprises acquiring an initial horizontal coordinate and an initial vertical coordinate of the touch point in the coordinate system, and wherein the movement direction of the touch point comprises a direction of a horizontal axis.

3. The method according to claim 2, wherein determining the motion parameter of the interface element object in each grid section on the screen according to the initial position and the movement direction comprises:
determining that in the direction of the horizontal axis of the coordinate system, the interface element object in the grid section in which a point that is N first unit distances away from the initial horizontal coordinate is located needs to move along the movement direction after a delay of M first unit times; and
determining that in the direction of a vertical axis of the coordinate system, the interface element object in the grid section in which a point that is A second unit distances away from the initial vertical coordinate is located needs to move along the movement direction after a delay of B second unit times, wherein N, A, M, and B are all positive integers, wherein the grid section within a preset range moves simultaneously with the touch point, and wherein the touch point is within the preset range.

4. The method according to claim 3, wherein the grid section is within the preset range when the grid section is in a column comprising a grid section in which the touch point is located, and is on a side, along the movement direction, of the grid section in which the touch point is located, or
wherein the grid section is within the preset range when the grid section is within c pixels in a radial direction from a center of the touch point, and wherein c is a non-negative number.

5. The method according to claim 3, wherein the grid section in which a point that is N first unit distances away from the initial horizontal coordinate is located is a grid section which a point that is N×a pixels away from the initial horizontal coordinate is located, wherein the grid section in which a point that is A second unit distances away from the initial vertical coordinate is located is a grid section in which a point that is A×b pixels away from the initial vertical coordinate is located, and wherein N, A, a, and b are all positive integers.

6. The method according to claim 3, wherein the grid section is within the preset range when the grid section is in a column comprising a grid section in which the touch point is located, and is on a side, along the movement direction, of the grid section in which the touch point is located.

7. The method according to claim 3, wherein the grid section is within the preset range when the grid section is within c pixels in a radial direction from a center of the touch point, and wherein c is a non-negative number.

8. The method according to claim 1, wherein a coordinate system is set on the screen, wherein acquiring the initial position of the touch point comprises acquiring an initial horizontal coordinate and an initial vertical coordinate of the touch point in the coordinate system, and wherein the movement direction of the touch point comprises a direction of a vertical axis.

9. The method according to claim 8, wherein determining the motion parameter of the interface element object in each grid section on the screen according to the initial position and the movement direction comprises:
determining that in the direction of a horizontal axis of the coordinate system, the interface element object in the grid section in which a point that is N first unit distances away from the initial horizontal coordinate is located needs to move along the movement direction after a delay of M first unit times; and
determining that in the direction of the vertical axis of the coordinate system, the interface element object in the grid section in which a point that is A second unit distances away from the initial vertical coordinate is located needs to move along the movement direction after a delay of B second unit times, wherein N, A, M, and B are all positive integers, wherein the grid section within a preset range moves simultaneously with the touch point, and wherein the touch point is within the preset range.

10. The method according to claim 9, wherein the grid section is within the preset range when the grid section is in a column comprising a grid section in which the touch point is located, and is on a side, along the movement direction, of the grid section in which the touch point is located, or
wherein the grid section is within the preset range when the grid section is within c pixels in a radial direction from a center of the touch point, and wherein c is a non-negative number.

11. The method according to claim 9, wherein the grid section is within the preset range when the grid section is in a column comprising a grid section in which the touch point is located, and that is on a side, along the movement direction, of the grid section in which the touch point is located.

12. The method according to claim 9, wherein the grid section is within the preset range when the grid section is within c pixels in a radial direction from a center of the touch point, and wherein c is a non-negative number.

13. The method according to claim 9, wherein the grid section in which a point that is N first unit distances away from the initial horizontal coordinate is located is a grid section in which a point that is N×a pixels away from the initial horizontal coordinate is located, wherein the grid section in which a point that is A second unit distances away from the initial vertical coordinate is located is a grid section in which a point that is A×b pixels away from the initial vertical coordinate is located, and wherein N, A, a, and b are all positive integers.

14. A terminal device, comprising:
   a memory; and
   a processor coupled to the memory, and wherein the processor is configured to:
      acquire an initial position and a movement direction of a touch point;
      determine a motion parameter of an interface element object in each grid section on a screen according to the initial position and the movement direction, wherein the screen is divided in advance into a grid comprising multiple grid sections arranged in rows and columns, and wherein each grid section comprises a preset quantity of pixels;
      set a row delay of each grid section based on a position of a row of a grid section relative to a row of the touch point;
      set a column delay of each grid section based on a position of a column of a grid section relative to a column of the touch point; and
      move the interface element object in each grid section according to the motion parameter of the interface element object in each grid section and a delay corresponding to each grid section, wherein the delay corresponding to each grid section is a sum of the row delay and the column delay, and wherein the row delay and the column delay each increase as a distance between the grid section and the touch point increases.

15. The terminal device according to claim 14, wherein a coordinate system is set on the screen of the terminal device, wherein the processor is further configured to acquire an initial horizontal coordinate and an initial vertical coordinate of the touch point in the coordinate system, and wherein the movement direction of the touch point comprises a direction of a horizontal axis or a direction of a vertical axis.

16. The terminal device according to claim 15, wherein the processor is further configured to:
   determine that in the direction of the horizontal axis of the coordinate system, the interface element object in the grid section in which a point that is N first unit distances away from the initial horizontal coordinate is located needs to move along the movement direction after a delay of M first unit times; and
   determine that in the direction of the vertical axis of the coordinate system, the interface element object in the grid section in which a point that is A second unit distances away from the initial vertical coordinate is located needs to move along the movement direction after a delay of B second unit times, wherein the grid section within a preset range moves simultaneously with the touch point, wherein the touch point is within the preset range, and wherein N, A, M, and B are all positive integers.

17. The terminal device according to claim 16, wherein the grid section is within the preset range when the grid section is in a column comprising a grid section in which the touch point is located, and is on a side, along the movement direction, of the grid section in which the touch point is located, or
   wherein the grid section is within the preset range when the grid section is within c pixels in a radial direction from a center of the touch point, and wherein c is a non-negative number.

18. The terminal device according to claim 16, wherein the grid section in which the point that is N first unit distances away from the initial horizontal coordinate is located is a grid section in which a point that is N×a pixels away from the initial horizontal coordinate is located, wherein the grid section in which a point that is A second unit distances away from the initial vertical coordinate is located is a grid section in which a point that is A×b pixels away from the initial vertical coordinate is located, and wherein N, A, a, and b are all positive integers.

19. The terminal device according to claim 16, wherein the grid section is within the preset range when the grid section is in a column comprising a grid section in which the touch point is located, and is on a side, along the movement direction, of the grid section in which the touch point is located.

20. The terminal device according to claim 16, wherein the grid section is within the preset range when the grid section is within c pixels in a radial direction from a center of the touch point, and wherein c is a non-negative number.

* * * * *

UNITED STATES PATENT AND TRADEMARK OFFICE
CERTIFICATE OF CORRECTION

PATENT NO. : 9,678,658 B2  
APPLICATION NO. : 15/068012  
DATED : June 13, 2017  
INVENTOR(S) : Ding Zhang and Hao Wu It is certified that error appears in the above-identified patent and that said Letters Patent is hereby corrected as shown below:

In the Claims

Column 11, Line 15, Claim 1 should read:
setting a column delay of each grid section based on a position of a column Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*